US010810615B2

(12) United States Patent
Mougenot et al.

(10) Patent No.: US 10,810,615 B2
(45) Date of Patent: Oct. 20, 2020

(54) ADVERTISING CREATIVE AND APPLICATION DELIVERY TO COMPUTING DEVICES

(71) Applicant: Criteo SA, Paris (FR)

(72) Inventors: Alix Mougenot, Paris (FR); Dan Teodosiu, Boulogne-Billancourt (FR)

(73) Assignee: Criteo SA, Paris (FR)

(*) Notice: Subject to any disclaimer, the term of this patent is extended or adjusted under 35 U.S.C. 154(b) by 0 days.

(21) Appl. No.: 14/555,532

(22) Filed: Nov. 26, 2014

(65) Prior Publication Data

US 2015/0324854 A1 Nov. 12, 2015

Related U.S. Application Data (63) Continuation-in-part of application No. 14/274,140, filed on May 9, 2014.

(51) Int. Cl.
*G06Q 30/02* (2012.01)
(52) U.S. Cl.
CPC ..... *G06Q 30/0251* (2013.01); *G06Q 30/0267* (2013.01); *H04M 2215/0192* (2013.01)
(58) Field of Classification Search
USPC .......... 705/7.2–7.37, 14.1–14.78, 27.1–27.7; 717/170–177; 718/1–137; 725/12–173
See application file for complete search history.

(56) References Cited

U.S. PATENT DOCUMENTS

| | | | |
|---|---|---|---|
| 2002/0023002 A1* | 2/2002 | Staehelin | G06Q 30/02 705/14.66 |
| 2003/0145317 A1* | 7/2003 | Chamberlain | G06F 8/61 717/177 |
| 2007/0061336 A1 | 3/2007 | Ramer et al. | |
| 2008/0004957 A1 | 1/2008 | Hildreth et al. | |
| 2008/0052140 A1 | 2/2008 | Neal et al. | |
| 2009/0006177 A1 | 1/2009 | Beaver et al. | |
| 2009/0070217 A1 | 3/2009 | Dharmaji et al. | |
| 2011/0125594 A1 | 5/2011 | Brown et al. | |
| 2011/0153426 A1 | 6/2011 | Reddy et al. | |

(Continued)

OTHER PUBLICATIONS

International Search Report from corresponding PCT Patent Application No. PCT/IB2015/001464, dated Dec. 22, 2015, 10 pages.

*Primary Examiner* — E Carvalho
(74) *Attorney, Agent, or Firm* — Proskauer Rose LLP (57) ABSTRACT

A method is performed by a computing device. A request is sent comprising request data, the request data comprising one or more identifiers. Payload data is received, where the payload data includes advertising creative retrieval data and application retrieval data for downloading one or more application installation files for an application, where the advertising creative is associated with the application. The advertising creative is downloaded. If the application is not installed on the computing device, the one or more application installation files are downloaded. An advertising creative display opportunity is generated. The advertising creative is displayed in the advertising creative display opportunity. If a user interaction with the advertising creative is detected and the application is not installed on the computing device, the application is installed from the downloaded one or more application files.

23 Claims, 5 Drawing Sheets

(56) References Cited

U.S. PATENT DOCUMENTS

| | | | |
|---|---|---|---|
| 2011/0202397 A1* | 8/2011 | Lam | G06Q 30/0252 |
| | | | 705/14.5 |
| 2011/0246298 A1 | 10/2011 | Williams et al. | |
| 2012/0110618 A1 | 5/2012 | Kilar et al. | |
| 2013/0061222 A1* | 3/2013 | Hwang | G06F 9/45516 |
| | | | 718/1 |
| 2013/0304581 A1 | 11/2013 | Soroca et al. | |
| 2014/0089109 A1 | 3/2014 | Ashbaugh | |
| 2015/0294346 A1* | 10/2015 | Di Giorgio | G06Q 30/0239 |
| | | | 726/9 |

\* cited by examiner

ADVERTISING CREATIVE AND APPLICATION DELIVERY TO COMPUTING DEVICES

CROSS REFERENCE TO RELATED PATENT APPLICATION

This application is a continuation-in-part of U.S. patent application Ser. No. 14/274,140, filed May 9, 2014, the entire contents of which are hereby incorporated by reference.

FIELD OF THE TECHNOLOGY

The present technology relates generally to delivering advertising creatives and applications to computing devices and, more specifically, to delivering advertising creatives and associated applications in advance of an opportunity to display advertising creatives.

BACKGROUND

Online and other electronic advertising allows advertisers to display advertisements (or ads) to end users, including those who are potential customers. For example, an application can include one or more opportunities for inserting advertisements (e.g., space for a banner advertisement, overlays, etc.). When a computing device (e.g., a mobile computing device such as a phone or tablet) is running an application in the foreground, an advertising opportunity can arise within the application. The application can request an advertisement from an advertising decision server (or ad decision server) for the advertising opportunity. The ad decision server can select an advertisement creative (e.g., an ad) for display within the area of the application display associated with the advertising opportunity. For example, the ad decision server can select a banner ad from a particular advertiser from a set of multiple banner ads from multiple advertisers for display to the user in the banner ad space of the application.

SUMMARY OF THE TECHNOLOGY

In some instances, requesting, by a computing device, an advertising creative for an advertising opportunity after the advertising opportunity has arisen can be undesirable. For example, mobile computing devices can have limited bandwidth. Requesting an advertising creative after the advertising opportunity has arisen can result in a delay in displaying the advertising creative while it is being downloaded. In some cases, the type of media that can be included in the advertising creative can be limited due to download time considerations. As another example, mobile computing devices can have intermittent network connectivity. An application can be unable to request an advertising creative after the advertising opportunity has arisen if the mobile computing device cannot reach the network. Accordingly, there is a need for delivering advertising creatives in advance of an opportunity to display advertising creatives. In some instances, an advertising creative can be associated with an application that can run on the computing device. The advertising creative can be for the application itself and/or for a use of the application. For example, interaction with the advertising creative can cause the application to be installed and/or executed. Downloading the application after the associated advertising creative is displayed can interrupt the user experience due to the time required for downloading the application. Accordingly, there is a need for delivering the application in advance of the opportunity to display the associated advertising creative.

In one aspect, there is a method performed by a computing device. The method includes sending, by the computing device, to an ad decision server, a request including request data, the request data including one or more identifiers. The method includes receiving, asynchronously with respect to the request, by the computing device, from the ad decision server, payload data, wherein the payload data includes advertising creative retrieval data for downloading one or more generated advertising creatives generated based at least in part on the request data. The method includes downloading, by the computing device, from one or more servers, one or more advertising creatives of the one or more generated advertising creatives based on the advertising creative retrieval data. The method includes generating, by the computing device, an advertising creative display opportunity. The method includes selecting, by the computing device, a first advertising creative of the one or more advertising creatives based on advertising selection criteria. The method includes displaying, by the computing device, the first advertising creative in the advertising creative display opportunity.

In some embodiments, the computing device is a mobile computing device. In some embodiments, the one or more generated advertising creatives include one or more of text data, HTML, XML, JSON, executable scripts, video data, 3D model data, and image data. In some embodiments, the method includes receiving, by the computing device, a push notification including the payload data. In some embodiments, the request data further includes one or more of application data, sensor data, computing device data, tracking data, and computing device location data. In some embodiments, the advertising selection criteria specifies selection of the first advertising creative of the one or more advertising creatives based on at least one of profile data associated with at least one of the one or more identifiers, application data, sensor data, computing device data, tracking data, advertising creative priority, advertising creative expected click rate, advertising creative display window, and device location.

In some embodiments, the method includes receiving, by the computing device, from the ad decision server, a message to display a second advertising creative; and displaying, by the computing device, the second advertising creative. In some embodiments, the message is a push notification. In some embodiments, the second advertising creative is one of the one of more advertising creatives. In some embodiments, the one or more identifiers include a device identifier associated with the computing device. In some embodiments, the one or more identifiers include a push token associated with the computing device. In some embodiments, generating, by the computing device, the advertising creative display opportunity includes generating the advertising creative display opportunity on a desktop or home screen of the computing device. In some embodiments, generating, by the computing device, the advertising creative display opportunity includes generating the advertising creative display opportunity in an application executed by the computing device.

In some embodiments, the method includes generating, by the computing device, the advertising creative display opportunity; selecting, by the computing device, the first advertising creative of the one or more advertising creatives based on advertising selection criteria; and displaying, by the computing device, the first advertising creative in the advertising creative display opportunity while the computing device is disconnected from the internet and/or other networks. In some embodiments, receiving the payload data and downloading the one or more advertising creatives of the one or more generated advertising creatives is performed by an application finning in the background on the computing device.

In another aspect, there is a method performed by a computing device. The method includes receiving, by the computing device, a state change notification. The method includes, in response to the state change notification, sending, by the computing device, to an ad decision server, a request including request data, the request data including one or more identifiers. The method includes, in response to the request, receiving, by the computing device, from the ad decision server, advertising creative retrieval data for downloading one or more generated advertising creatives generated based at least in part on the request data. The method includes downloading, by the computing device, from one or more servers, one or more advertising creatives of the one or more generated advertising creatives based on the advertising creative retrieval data. The method includes generating, by the computing device, an advertising creative display opportunity. The method includes selecting, by the computing device, a first advertising creative of the one or more advertising creatives based on advertising selection criteria. The method includes displaying, by the computing device, the first advertising creative in the advertising creative display opportunity.

In some embodiments, the state change notification is a callback from an operating system executing on the computing device. In some embodiments, the computing device is a mobile computing device. In some embodiments, the one or more generated advertising creatives include one or more of text data, HTML, XML, JSON, executable scripts, video data, 3D model data, and image data. In some embodiments, the request data further includes one or more of profile data, application data, sensor data, computing device data, tracking data, and computing device location data. In some embodiments, the advertising selection criteria specifies selection of the first advertising creative of the one or more advertising creatives based on at least one of profile data associated with at least one of the one or more identifiers, application data, sensor data, computing device data, tracking data, advertising creative priority, advertising creative expected click rate, advertising creative display window, and device location. In some embodiments, the one or more identifiers include a device identifier associated with the computing device. In some embodiments, generating, by the computing device, the advertising creative display opportunity includes generating the advertising creative display opportunity on a desktop or home screen of the computing device. In some embodiments, generating, by the computing device, the advertising creative display opportunity includes generating the advertising creative display opportunity in an application executed by the computing device.

In some embodiments, the method includes generating, by the computing device, the advertising creative display opportunity; selecting, by the computing device, the first advertising creative of the one or more advertising creatives based on advertising selection criteria; and displaying, by the computing device, the first advertising creative in the advertising creative display opportunity while the computing device is disconnected from the internet and/or other networks. In some embodiments, receiving the advertising creative retrieval data and downloading the one or more advertising creatives of the one or more generated advertising creatives is performed by an application running in the background on the computing device.

In another aspect, there is a method performed by an ad decision server. The method includes receiving, by the ad decision server, from a computing device, a request including request data, the request data including one or more identifiers. The method includes generating, by the ad decision server, one or more generated advertising creatives based at least in part on the request data. The method includes sending, by the ad decision server, to the computing device, payload data, wherein the payload data includes advertising creative retrieval data for downloading the one or more generated advertising creatives, wherein the wherein the payload data is sent prior to the computing device generating an advertising creative display opportunity for the one of the one or more generated advertising creatives.

In some embodiments, the method includes generating, by the ad decision server, second one or more generated advertising creatives based at least in part on a determination to update the one or more generated advertising creatives; and sending, by the ad decision server, to the computing device, second payload data, wherein the second payload data includes second advertising creative retrieval data for downloading the second one or more generated advertising creatives.

In some embodiments, the one or more generated advertising creatives include one or more of text data, HTML, XML, JSON, executable scripts, video data, 3D model data, and image data. In some embodiments, the method includes sending, by the ad decision server, to the computing device, a push notification including the payload data. In some embodiments, the request data further includes one or more of profile data, application data, sensor data, computing device data, tracking data, and device location. In some embodiments, the method includes generating, by the ad decision server, the one or more generated advertising creatives based on one or more of the profile data, application data, the sensor data, the computing device data, the tracking data, and the computing device location. In some embodiments, the method includes sending, by the ad decision server, to the computing device, a message to display a second advertising creative. In some embodiments, the message is a push notification. In some embodiments, the second advertising creative is one of the one of more generated advertising creatives. In some embodiments, the request for one or more advertising creatives is received from an application running in the background on the computing device.

In another aspect, there is a method performed by a computing device. The method includes sending, by the computing device, to an ad decision server, a request including request data, the request data including one or more identifiers. The method includes receiving, by the computing device, from the ad decision server, payload data, the payload data includes advertising creative retrieval data for downloading an advertising creative generated based at least in part on the request data and application retrieval data for downloading one or more application installation files for an application, the advertising creative is associated with the application. The method includes downloading, by the computing device, from one or more servers, the advertising creative based on the advertising creative retrieval data. The method includes, if the application is not installed on the computing device, downloading, by the computing device, from a second one or more servers, the one or more application installation files based on the application retrieval data. The method includes generating, by the computing device, an advertising creative display opportunity. The method includes displaying, by the computing device, the advertising creative in the advertising creative display opportunity. The method includes, if a user interaction with the advertising creative is detected and the application is not installed on the computing device, installing, by the computing device, the application from the downloaded one or more application files. In some embodiments, the one or more application installation files include one or more Android Application Package files.

In some embodiments, the method includes, after installation of the application completes, registering, by the computing device, an installation status of the application. In some embodiments, the computing device is a mobile computing device. In some embodiments, the method includes receiving, by the computing device, a push notification including the payload data. In some embodiments, the user interaction with the advertising creative includes a click on the advertising creative. In some embodiments, the method includes executing, by the computing device, the application if the user interaction with the advertising creative is detected. In some embodiments, the method includes determining, by the computing device, an initial state of the application based on the payload data; and executing, by the computing device, the application based on the initial state. In some embodiments, the advertising creative contains a deeplink associated with the application, and the method includes executing, by the computing device, the application based on the deeplink. In some embodiments, the method includes configuring, by the computing device, the application based on the advertising creative. In some embodiments, the method includes writing, by the computing device, application data to a memory space associated with the application.

In another aspect there is a method performed by a computing device. The method includes receiving, by the computing device, a state change notification. The method includes, in response to the state change notification, sending, by the computing device, to an ad decision server, a request including request data, the request data including one or more identifiers. The method includes, in response to the request, receiving, by the computing device, from the ad decision server, payload data, the payload data includes advertising creative retrieval data for downloading an advertising creative generated based at least in part on the request data, and application retrieval data for downloading one or more application installation files for an application, the advertising creative is associated with the application. The method includes downloading, by the computing device, from one or more servers, the advertising creative based on the advertising creative retrieval data. The method includes, if the application is not installed on the computing device, downloading, by the computing device, from a second one or more servers, the one or more application installation files based on the application retrieval data. The method includes generating, by the computing device, an advertising creative display opportunity. The method includes displaying, by the computing device, the advertising creative in the advertising creative display opportunity. The method includes, if a user interaction with the advertising creative is detected and the application is not installed on the computing device, installing, by the computing device, the application from the downloaded one or more application files. In some embodiments, the one or more application installation files include one or more Android Application Package files.

In some embodiments, the method includes, after installation of the application completes, registering, by the computing device, an installation status of the application. In some embodiments, the computing device is a mobile computing device. In some embodiments, the user interaction with the advertising creative includes a click on the advertising creative. In some embodiments, the method includes executing, by the computing device, the application if the user interaction with the advertising creative is detected. In some embodiments, the method includes determining, by the computing device, an initial state of the application based on the payload data; and executing, by the computing device, the application based on the initial state. In some embodiments, the advertising creative contains a deeplink associated with the application, and the method further includes executing, by the computing device, the application based on the deeplink. In some embodiments, the method includes configuring, by the computing device, the application based on the advertising creative. In some embodiments, the method includes writing, by the computing device, application data to a memory space associated with the application.

In another aspect, there is a method performed by an ad decision server. The method includes receiving, by the ad decision server, from a computing device, a request including request data, the request data including one or more identifiers. The method includes generating, by the ad decision server, an advertising creative based at least in part on the request data. The method includes sending, by the ad decision server, to the computing device, payload data, the payload data includes advertising creative retrieval data for downloading the generated advertising creative and application retrieval data for downloading one or more application installation files for an application, the advertising creative is associated with the application, and the payload data is sent prior to the computing device generating an advertising creative display opportunity for the advertising creative. In some embodiments, the one or more application installation files include one or more Android Application Package files.

In some embodiments, the method includes sending, by the ad decision server, to the computing device, a push notification including the payload data. In some embodiments, the advertising creative contains a deeplink associated with the application.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

In some embodiment, the technology described herein facilitates delivering advertising creatives in advance of an opportunity to display the advertising creatives. In an exemplary application of the technology, an application running on a computing device (e.g., a mobile computing device) can send a request including identifying information to an ad decision server to indicate to the ad decision server that the application may have one or more advertising opportunities in the future. Synchronously or asynchronously with respect to the request, the ad decision server can generate advertising creatives for the application. The ad decision server can then provide retrieval data to the application indicating that ad creatives are available for downloading. In a background process and when the computing device's connection meets certain criteria, the application can download the advertising creatives. When the application generates an advertising creative display opportunity at some later time (e.g., when the application is executing in the foreground and/or is visible to the user), the computing device already has one or more advertising creatives stored locally that can be displayed in the opportunity. Beneficially, because the computing device already has one or more advertising creatives stored locally, the application can have advertising creatives to populate advertising creative display opportunities when the computing device is disconnected from the internet and/or other networks. In some applications, advertising creatives can include more types of media (e.g., media that requires larger amounts of data) because the advertising creatives can be download in advance of the display opportunities. In some embodiments, application installation files associated with the advertising creative can be downloaded when the advertising creative is downloaded. Beneficially, because the computing device already has the application installation files stored locally, the application associated with the advertising creative can be installed from the computing device's memory. In some instances, this can happen faster than an application installation that involves downloading the application installation files at the time of the installation, which can result in a more fluid user experience.

Figure 1:
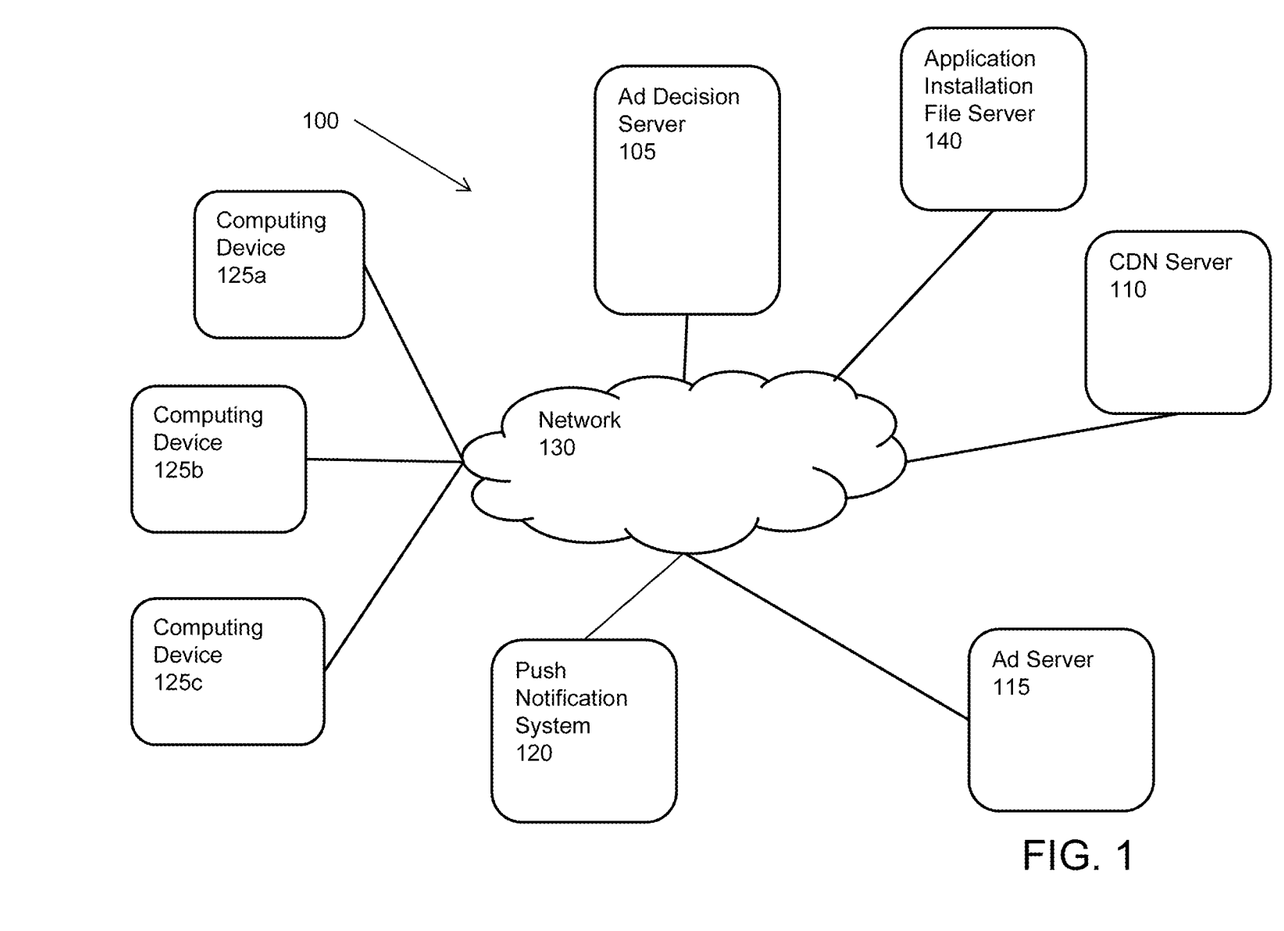
FIG. 1 is a diagram of a network system in accordance with embodiments of the technology.

FIG. 1 is a diagram of a network system 100 in accordance with embodiments of the technology. As illustrated, network system 100 can include an ad decision server 105, content distribution network (CDN) server 110, ad server 115, push notification system 120, application installation file server 140, and computing devices 125. In network system 100, ad decision server 105, CDN server 110, ad server 115, application installation file server 140, and computing devices 125 can be in data communication with each other via network 130.

Ad decision server 105 can be any computing device, such as a server or multiple servers. In some embodiments, ad decision server 105 can generate advertising creatives as described in greater detail below. CDN server 110 can be any computing device, such as a server or multiple servers. In some embodiments, CDN server 110 can be an edge server fir a content distribution network. In some embodiments, CDN server 110 can store advertising creatives and/or elements thereof (e.g., constituent images, audio files, video files, etc. of creatives). Ad server 115 can be any computing device, such as a server or multiple servers. In some embodiments, ad server 115 can store advertising creatives and/or elements thereof (e.g., constituent images, audio files, video files, etc. of creatives). Push notification system 120 can be any computing device, such as a server or multiple servers. In some embodiments, push notification system 120 can be any system for delivering push notifications to computing devices 125 (e.g., the APPLE Push Notification service or ANDROID Cloud Messaging). Application installation file server 140 can be any computing device, such as a server or multiple servers. In some embodiments, application installation file server 140 can store application installation files. Computing devices 125 can be any computing devices. In some embodiments, computing devices 125 can be mobile computing devices (e.g., cellular phone and/or tablet). Network 130 can be any network or multiple networks. For example, network 130 can include cellular networks to which computing devices 125 are connected and the Internet.

Figure 2:
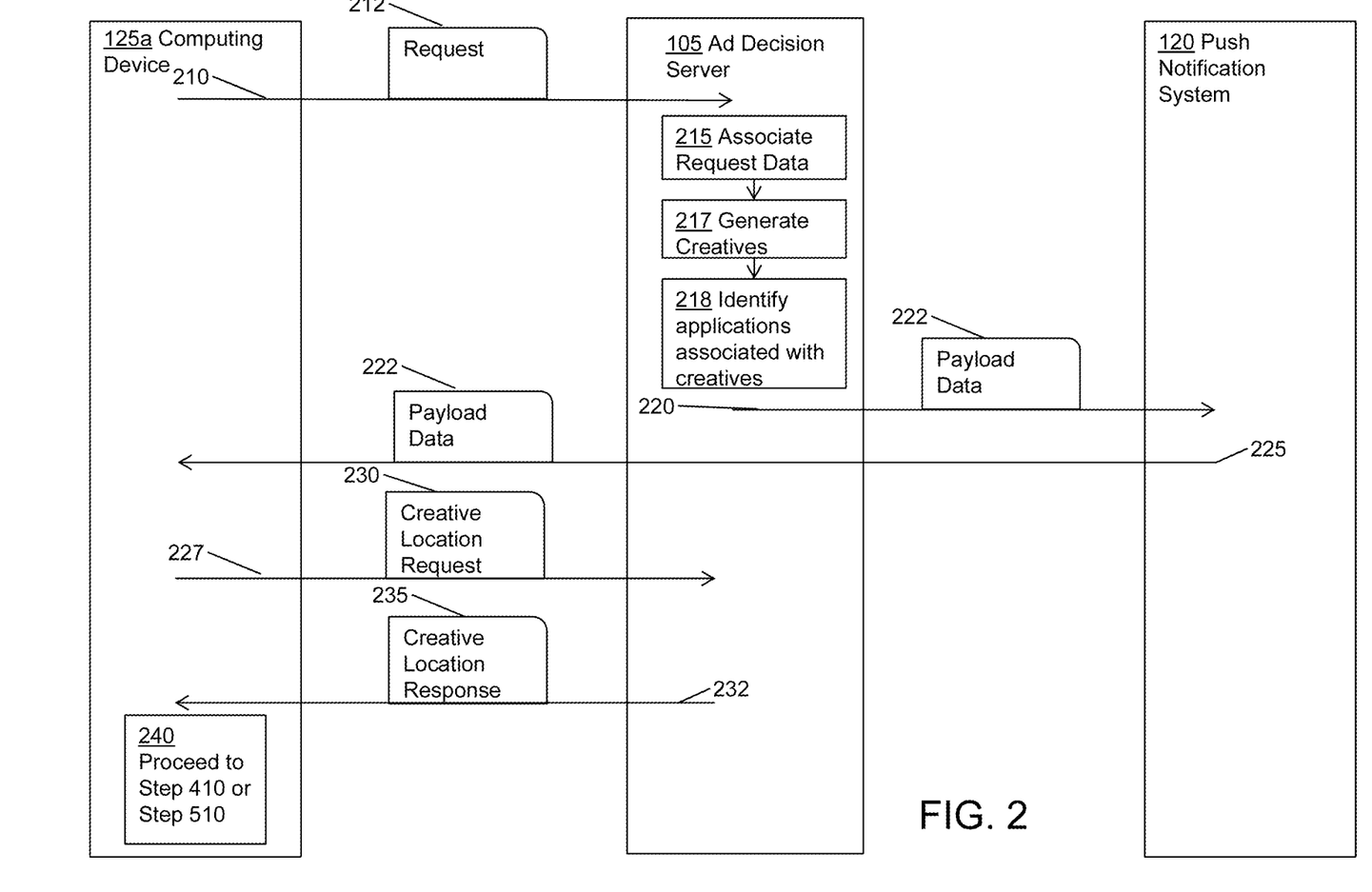
FIG. 2 depicts a flow chart illustrating a method of providing advertising creatives and application installation files to a computing device in accordance with embodiments of the technology.

FIG. 2 depicts a flow chart illustrating a method of providing advertising creatives and application installation files to computing device 125a in accordance with embodiments of the technology. In the illustrated embodiment, communications between computing device 125a, ad decision server 105, and push notification system 120 can be via network 130. At transmission step 210, computing device 125a (or an application running thereon) sends to ad decision server 105 request 212. Request 212 can include request data. The request data can include one or more identifiers. For example, the identifiers can identify computing device 125a and/or a user of computing device 125a. In some embodiments, the identifiers can include a push token associated with computing device 125a. In some embodiments, the identifiers can include a user ID. In some embodiments, the identifiers can include the identifierForAdvertising (IDFA). The request data can include information for use by ad decision server 105 in generating advertising creatives. For example, the request data can include application data (e.g., data related to the application running on computing device 125a that is sending the request), sensor data (e.g., data collected by sensors on computing device 125a), computing device data (e.g., data related to computing device 125a, such as its type, hardware, operating system, etc.), tracking data (e.g., data related to activity by the user of computing device 125a, such as retailer websites visited and/or products viewed), and computing device location data (e.g., data related to the location of computing device 125a). In some embodiments, request 212 can be sent by an application running in the background on computing device 125a.

At processing step 215, ad decision server 105 associates the request data from request 212 with a profile (e.g., a profile stored by ad decision server 105). The profile can be associated with computing device 125a. In some embodiments, the profile can be associated with a user and/or individual. Ad decision server 105 can determine to which profile to associate the request based on the one or more identifiers in request 212. In some embodiments, the profile is determined by ad decision server 105 based on the user ID. At processing step 217, ad decision server 105 generates advertising creatives based at least in part on the request data in request 212. For example, ad decision server 105 can generate ad creatives targeted to computing device 125a based on the identifiers, application data, sensor data, computing device data, tracking data, and computing device location data received in request 212. Ad decision server 105 can generate advertising creatives based at least in part on profile data (e.g., such as information about the user collected from other devices). In some embodiments, the advertising creatives can include one or more of text data, HTML, XML, JSON, executable scripts, video data, 3D model data, and image data. At processing step 218, ad decision server 105 can identify applications associated with the advertising creatives. For example, ad decision server 105 can identify one or more applications associated with one or more of the advertising creatives generated at step 217. In some embodiments, if an advertising creative is an advertisement for an application and/or a use of an application, ad decision server 105 can identify the application as associated with the advertising creative. For example, if the advertising creative is an advertisement for a plane ticket available through a travel application, ad decision server 105 can identify the travel application.

At transmission step 220, ad decision server 105 sends to push notification system 120 payload data 222 for delivery to computing device 125a as a part of a push notification. In some embodiments, the push notification can be a silent push notification (e.g., an application running on computing device 125a can process the push notification in the background). Payload data 222 can include advertising creative retrieval data to permit computing device 125a to download one or more of the advertising creatives generated in processing step 217. In some embodiments, the creative retrieval data can include a key or token which computing device 125a can provide to ad decision server 105 to retrieve the advertising creatives (e.g., when the payload data of the push notification is limited to small amounts of data). In some embodiments, the creative retrieval data can include URLs for the creatives, rules for the creatives, expiration times for the creatives, etc.

In some embodiments, payload data 222 can include application retrieval data to permit computing device 125a to download application installation files for one or more applications associated with the advertising creatives generated at step 217. In some embodiments, the application retrieval data can include URLs for the one or more application installation files, which computing device 125a can provide to application installation file server 140 to download one or more application installation files. In some embodiments, the application retrieval data can include a key or token, which computing device 125a can provide to application installation file server 140 to retrieve the one or more application installation files (e.g., when the payload data of the push notification is limited to small amounts of data). In some embodiments, the application retrieval data can include the name of the identified associated application.

At transmission step 225, push notification system 120 sends payload data 222 to computing device 125a. In some embodiments, payload data 222 is delivered to computing device 125a asynchronously with respect to request 212 (e.g., processing step 217 and transmission steps 220 and 225 can occur hours or days after request 212 is sent). In some embodiments, ad decision server 105 can periodically or in response to new data regenerate creatives (e.g., as in processing step 217) and application retrieval data (e.g., as in processing step 218) and send new payload data to computing device 125a (e.g., as in transmission steps 220 and 225). At transmission step 227, computing device 125a sends to ad decision server 105 creative location request 230. For example, computing device 125a can send a key or token from payload data 222 as a part of creative location request 230. In some embodiments, an application executing in the background on computing device 125a can send location request 230. In some embodiments, a task executing in the background on computing device 125a can send location request 230. At step 232, ad decision server 105 sends creative location response 235. Creative location response 235 can include URLs for the creatives, rules for the creatives, expiration times for the creatives, etc. As noted above, in some embodiments, URLs for the creatives, rules for the creatives, expiration times for the creatives, etc. can be sent as a part of payload data 222. In such embodiments, transmission steps 227 and 232 can be unnecessary. In some embodiments, at processing step 240, if no application retrieval data is received in payload data 222, computing device 125a downloads the advertising creatives and displays advertising creatives as described in greater detail with respect to FIG. 4. In some embodiments, at processing step 240, if application retrieval data is received in payload data 222, computing device 125a downloads the advertising creatives and the application installation files and displays advertising creatives as described in greater detail with respect to FIG. 5.

Figure 3:
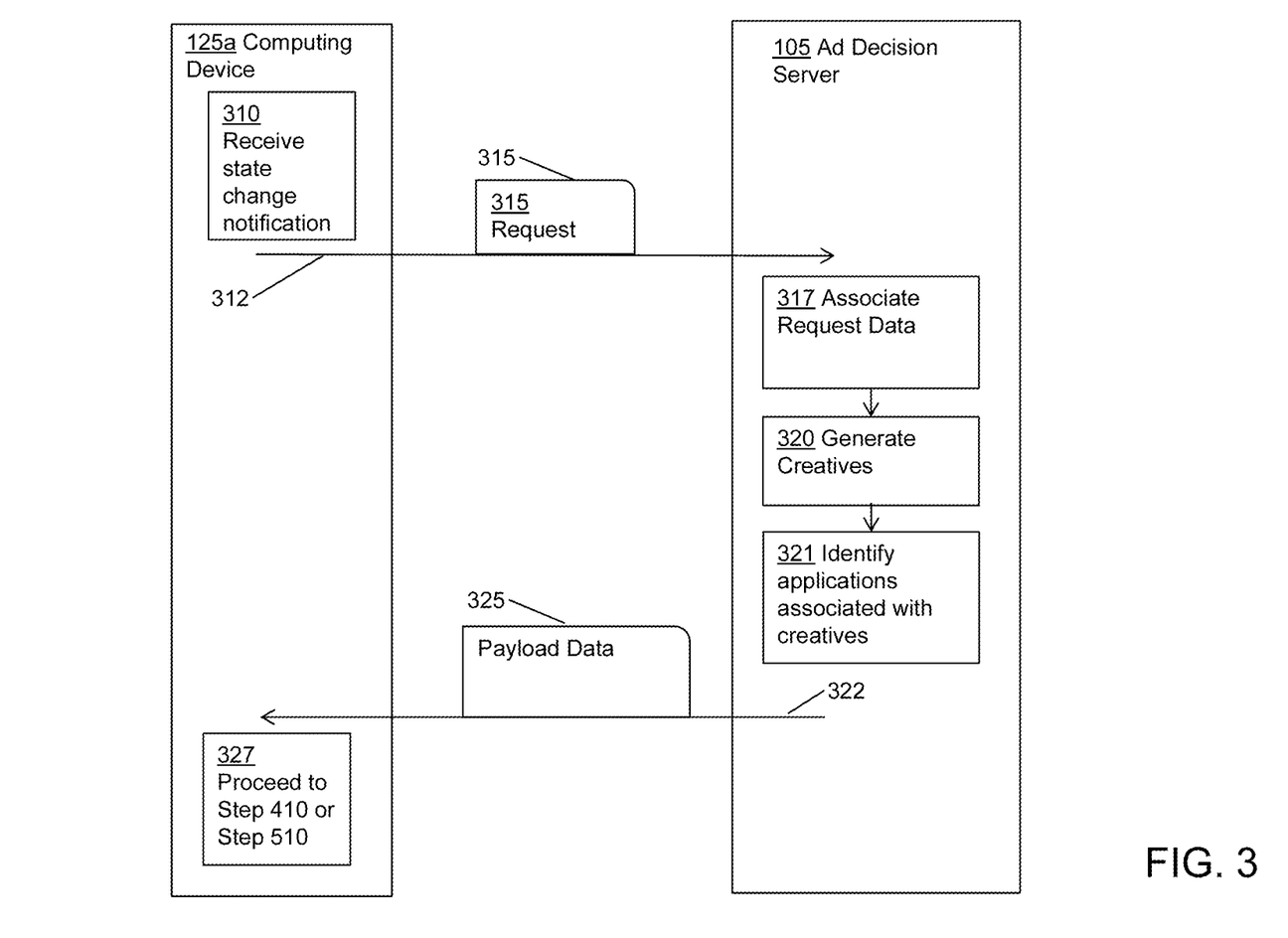
FIG. 3 depicts a flow chart illustrating a method of providing advertising creatives and application installation files to a computing device in accordance with embodiments of the technology.

FIG. 3 depicts a flow chart illustrating a method of providing advertising creatives and application installation files to computing device 125a in accordance with embodiments of the technology. In the illustrated embodiment, communications between computing device 125a and ad decision server 105 can be via network 130. At processing step 310, computing device 125a receives a state change notification. In some embodiments, the state change notification can be a callback from an operating system running on computing device 125a. For example, an operating system running on computing device 125a can send the callback when an application is likely to be executed, when computing device 125a is in a particular location, etc. An application on computing device 125a can define a callback function to be run in response to receiving the callback. In some embodiments, an operating system running on computing device 125a can invoke the callback function (e.g., in a background task). In some embodiments, an application executing in the background on computing device 125a can receive the state change notification. In some embodiments, a task executing in the background on computing device 125a can receive the state change notification.

At transmission step 312, in response to receiving the state change notification, computing device 125a sends request 315 to ad decision server 105. For example, the callback function described above can send request 315 to ad decision server 105. Request 315 can include any of the data as described above with respect to request 212. In some embodiments, request 315 can be sent by an application and/or tasks running in the background on computing device 125a.

At processing step 317, ad decision server 105 associates the request data from request 315 with a profile (e.g., a profile stored by ad decision server 105) as described above with respect to processing step 215. At processing step 320, ad decision server 105 generates advertising creatives based at least in part on the request data in request 315 as described above with respect to processing step 217. At processing step 321, ad decision server 105 can identify one or more applications associated with one or more advertising creatives generated at step 320, as described above with respect to processing step 218.

At transmission step 322, ad decision server sends to computing device 125a payload data 325, which can include advertising creative retrieval data and application retrieval data to permit computing device 125a to download one or more of the advertising creatives generated in processing step 320 and to download one or more application installation files for applications associated with one or more advertising creatives. In some embodiments, the creative retrieval data can include URLs for the creatives, rules for the creatives, expiration times for the creatives, etc. In some embodiments, application retrieval data can include URLs for application installation files which computing device 125a can provide to application installation file server 140 to download one or more application installation files. In some embodiments, at processing step 327, if no application retrieval data is received in payload 325, computing device 125a downloads the advertising creatives and displays advertising creatives as described in greater detail with respect to FIG. 4. In some embodiments, at processing step 327, if application retrieval data is received in payload data 325, computing device 125a downloads the advertising creatives and application installation files as described in greater detail with respect to FIG. 5.

Figure 4:
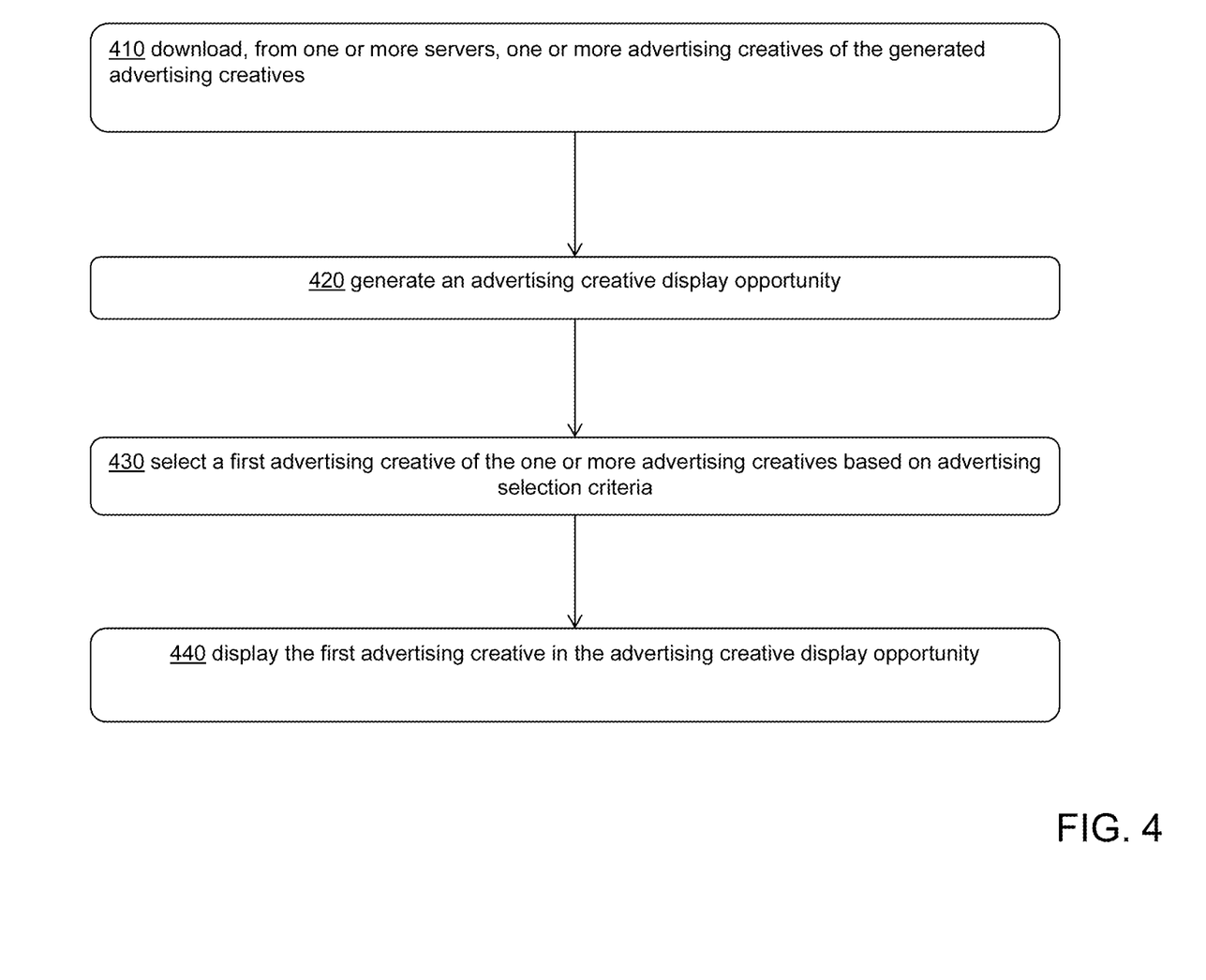
FIG. 4 depicts a flow chart illustrating a method performed by a computing device to download and display advertising creatives.

FIG. 4 depicts a flow chart illustrating a method performed by computing device 125c to download and display advertising creatives. In some embodiments, the method illustrated in FIG. 4 can be performed by computing device 125a after it has received data indicating the location of the advertising creatives generated as illustrated in FIG. 2 or FIG. 3. At step 410, computing device 125a downloads, from one or more servers (e.g., ad decision server 105, CDN server 110, or ad server 115), one or more advertising creatives of the generated advertising creatives. In some embodiments, downloading the one or more advertising creatives can be performed by an application and/or tasks running in the background on computing device 125a. In some embodiments, the download can be delayed based on the connectivity of computing device 125a. For example, computing device 125a can delay downloading advertising creatives until, it is connected to the Internet. Computing device 125a can delay downloading advertising creatives until, for example, it is connected to the Internet via WiFi. In some embodiments, computing device 125a can determine that the advertising creatives are stale (e.g., have expired) and can determine not to download the advertising creatives.

At step 420, computing device 125a generates an advertising creative display opportunity. In some embodiments, an application running on computing device 125a can generate an advertising creative display opportunity (e.g., the application can determine that there will be space on the screen for displaying an advertising creative). In some embodiments, an application executing in the foreground on computing device 125a can generates an advertising creative display opportunity. For example, while the creative can be downloaded by an application and/or tasks, the application can generate advertising creative display opportunities only when running in the foreground. In some embodiments, the advertising creative display opportunity can be in the context of the application (e.g., the advertising creative display opportunity can be a on a billboard or on a TV within a video game). In some embodiments the advertising creative display opportunity can be on a desktop or home screen of computing device 125a.

At step 430, computing device 125a selects a first advertising creative of the one or more advertising creatives based on advertising selection criteria. In some embodiments, the advertising selection criteria specifies selection of the first advertising creative based on at least one of profile data, application data, sensor data, computing device data, tracking data, advertising creative priority, advertising creative expected click rate, advertising creative display window, and device location. At step 440, computing device 125a displays the first advertising creative in the advertising creative display opportunity. Beneficially, computing device 125a can select and display advertising creatives from those downloaded in step 410 even when computing device 125a does not have network connectivity. In some embodiments, ad decision server 105 can send to computing device 125a a message (e.g., a push notification) to display a second advertising creative, and computing device 125a can display the second advertising creative. In some embodiments, the second advertising creative can be an advertising creative previously downloaded (e.g., at step 410).

Figure 5:
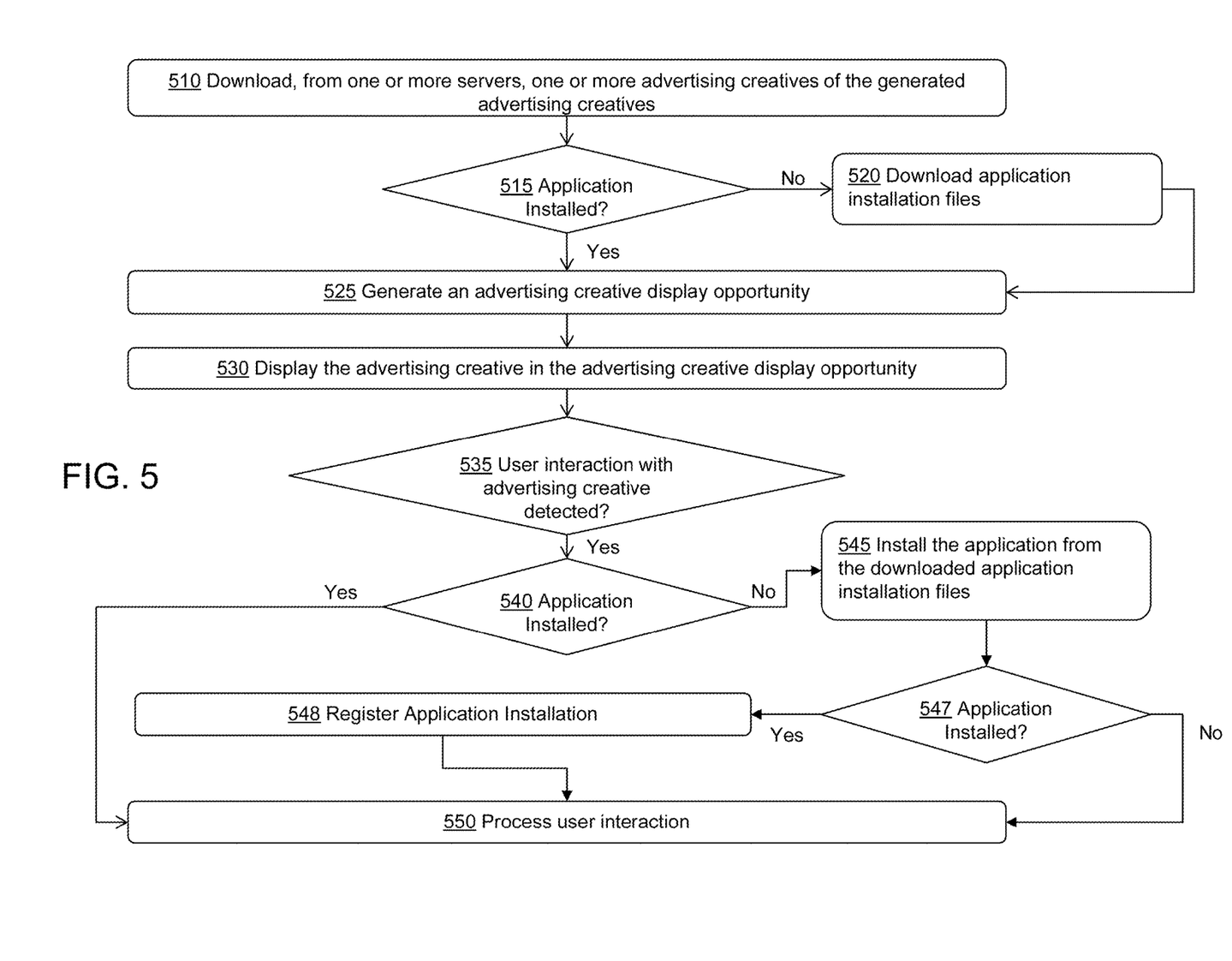
FIG. 5 depicts a flow chart illustrating a method performed by a computing device to download and display one or more advertising creatives and download and install application installation files.

FIG. 5 depicts a flow chart illustrating a method performed by computing device 125a to download and display one or more advertising creatives and download and install application installation files. At step 510, computing device 125a downloads, from one or more servers (e.g., ad decision server 105, CDN server 110, or ad server 115), the one or more advertising creatives. The computing device 125a can download the one or more advertising creatives based on the advertising creative retrieval data described with respect to FIGS. 2 and/or 3. In some embodiments, downloading the one or more advertising creatives can be performed by an application and/or tasks running in the background on computing device 125a. In some embodiments, the download can be delayed based on the connectivity of computing device 125a. For example, computing device 125a can delay downloading the one or more advertising creatives until it is connected to the Internet. Computing device 125a can delay downloading the one or more advertising creatives until, for example, it is connected to the Internet via WiFi. In some embodiments, computing device 125a can determine that the one or more advertising creatives are stale (e.g., have expired) and can determine not to download the one or more advertising creative and the application installation files.

At step 515, computing device 125a determines if an application associated with one or more of the one or more advertising creatives is installed on computing device 125a. For example, computing device 125a can use its operating system to determine whether the application is installed, for example by using a bundle ID or a deeplink. If the application is installed, the process proceeds to step 525. If the application is not installed, the process proceeds to step 520. At step 520, computing device 125a can download application installation files for the application based on application retrieval data described with respect to FIGS. 2 and/or 3. In some embodiments, computing device 125a downloads application installation files from application installation file server 140.

At step 525 computing device 125a generates an advertising creative display opportunity. In some embodiments, an application running on computing device 125a can generate an advertising creative display opportunity (e.g., the application can determine that there will be space on the screen for displaying an advertising creative). In some embodiments, an application executing in the foreground on computing device 125a can generate an advertising creative display opportunity. For example, while the creative can be downloaded by an application and/or tasks, the application can generate advertising creative display opportunities only when running in the foreground. In some embodiments, the advertising creative display opportunity can be in the context of the application (e.g., the advertising creative display opportunity can be on a billboard or on a TV within a video game). In some embodiments, the advertising creative display opportunity can be on a desktop or home screen of computing device 125a.

At step 530, computing device 125a displays an advertising creative of the one or more downloaded advertising creatives in the advertising creative display opportunity. Beneficially, computing device 125a can select and display the advertising creative even when computing device 125a does not have network connectivity. At step 535, computing device 125a determines if a user interaction with the displayed advertising creative is detected. For example, computing device 125a can detect if the user clicks on the displayed advertising creative. If a user interaction with the displayed advertising creative is detected, the process proceeds to step 540.

At step 540, computing device 125a determines if the application associated with the advertising creative is installed. If the application is installed, the process proceeds to step 550. If the application is not installed, the process proceeds to step 545. At step 545, computing device 125a installs the application using one or more application installation files downloaded in step 520. In some embodiments, the application installation files can include ANDROID Application Package files. In some embodiments, computing device 125a can launch an ANDROID Intent that will trigger the installation of the downloaded application installation files. At step 547, computing device 125a determines if the application installed successfully. If the application the application did not install successfully, the process proceeds to step 550. If the application did install successfully, the process proceeds to step 548. At step 548, computing device 125a registers an installation status (e.g., with ad decision server 105) indicating that the application is installed on computing device 125a. The process proceeds to step 550.

At step 550, computing device 125a processes the user interaction with the advertising creative. In some embodiments, if the application has not been successfully installed, computing device can display a website and/or an app store application from which the application can be installed. In some embodiments, if the application has been successfully installed, computing device 125a can execute the application in response to the user interaction. In some embodiments, the application can be executed beginning at an initial state based on the received payload data. In some embodiments, the advertising creative can contain a deeplink associated with the application. The deeplink can be a reference to and/or data for a particular aspect of the application. For example, if the advertising creative is an advertisement for a plane ticket available through a travel application, the deeplink can cause the travel application to begin executing from a screen that offers the plane ticket for purchase. In some embodiments, computing device 125a can configure the application based on the advertising creative. For example, optional features of the application can be enabled in the application. In some embodiments, computing device 125a can write application data to a memory space associated with the application. For example, computing device 125a can write information about the user of computing device 125a to the memory space of the application so that the application can use the information when executing.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier interact protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, fir example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), a Peer-to-Peer (P2P) protocol, Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. Mobile computing device includes, for example, a Blackberry® from Research in Motion, an iPhone® from Apple Corporation, and/or an Android™-based device.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A method performed by a computing device comprising:
   a) sending, by a first application executing on the computing device in a background process, to an ad decision server, a request comprising request data, the request data comprising one or more identifiers related to at least one of the computing device or a user of the computing device;
   b) receiving, by the first application executing on the computing device, from the ad decision server asynchronously with respect to the request, payload data, wherein the payload data includes advertising creative retrieval data for downloading an advertising creative generated based at least in part on the one or more identifiers in the request data and application retrieval data for downloading one or more application installation files for a second application, wherein the advertising creative is associated with the second application;
   c) downloading, by the first application executing on the computing device in the background process, from one or more servers, the advertising creative based on the advertising creative retrieval data, wherein prior to downloading the advertising creative, the computing device determines that the advertising creative is not expired based upon an expiration time for the advertising creative in the advertising creative retrieval data;
   d) determining, by the first application executing on the computing device, whether the second application is installed on the computing device;
   e) determining, by the first application executing on the computing device in the background process, whether a network connection of the computing device is connected;
   f) downloading, by the first application executing on computing device in the background process, from a second one or more servers, the one or more application installation files based on the application retrieval data upon determining that the second application is not installed on the computing device, wherein prior to downloading the application installation files, the computing device determines that the advertising creative is not expired based upon the expiration time for the advertising creative in the advertising creative retrieval data;
   g) determining, by the first application executing on the computing device in a foreground process, that there will be space on a screen within the first application for displaying the advertising creative and when the network connection of the computing device is disconnected, including determining a display area for the advertising creative based upon a visual context of the first application;
   h) displaying, by the first application executing on the computing device in the foreground process, the advertising creative previously downloaded to the computing device within the determined display area of the first application;
   i) detecting, by the first application executing on the computing device in the foreground process, a user interaction with the displayed advertising creative;
   j) installing, by the computing device, the second application using the downloaded one or more application installation files upon detecting the user interaction with the advertising creative and upon determining that the second application is not installed on the computing device;
k) determining, by the computing device, whether the second application is installed successfully on the computing device when the installation process ends; and
l) displaying, by the computing device, a website from which the second application can be installed when the second application is not installed successfully on the computing device.

2. The method of claim 1, further comprising, after installation of the second application, registering, by the computing device, an installation status of the second application.

3. The method of claim 1, wherein the computing device is a mobile computing device.

4. The method of claim 1, further comprising receiving, by the first application executing on the computing device in the background process, a push notification comprising the payload data.

5. The method of claim 1, wherein the user interaction with the advertising creative comprises a click on the advertising creative.

6. The method of claim 1, further comprising executing, by the computing device, the second application upon detecting the user interaction with the advertising creative and upon determining that the first application is installed successfully.

7. The method of claim 1, wherein the advertising creative contains a deeplink associated with the first application, the method further comprising executing, by first application on the computing device, the second application based on the deeplink.

8. The method of claim 1, further comprising configuring, by the computing device, the second application based on the advertising creative.

9. The method of claim 1, further comprising writing, by the computing device, application data to a memory space associated with the second application.

10. The method of claim 1, wherein the one or more application installation files comprise one or more Android Application Package files.

11. A method performed by a computing device comprising:
a) receiving, by a first application executing on the computing device in a background process, a state change notification;
b) in response to the state change notification, sending, by the first application executing on the computing device, to an ad decision server, a request comprising request data, the request data comprising one or more identifiers related to at least one of the computing device or a user of the computing device;
c) in response to the request, receiving, by the first application executing on the computing device in the background process, from the ad decision server, payload data, wherein the payload data includes advertising creative retrieval data for downloading an advertising creative generated based at least in part on the one or more identifiers in the request data and application retrieval data for downloading one or more application installation files for a second application, wherein the advertising creative is associated with the second application;
d) downloading, by the first application executing on the computing device in the background process, from one or more servers, the advertising creative based on the advertising creative retrieval data, wherein prior to downloading the advertising creative, the computing device determines that the advertising creative is not expired based upon an expiration time for the advertising creative in the advertising creative retrieval data;
e) determining, by the first application executing on the computing device, whether the second application is installed on the computing device;
f) determining, by the first application executing on the computing device in the background process, whether a network connection of the computing device is connected;
g) downloading, by the first application executing on the computing device in the background process, from a second one or more servers, the one or more application installation files based on the application retrieval data upon determining that the second application is not installed on the computing device, wherein prior to downloading the application installation files, the computing device determines that the advertising creative is not expired based upon the expiration time for the advertising creative in the advertising creative retrieval data;
h) determining, by the first application executing on the computing device in a foreground process, that there will be space on a screen within the first application on the computing device for displaying the advertising creative and when the network connection of the computing device is disconnected, including determining a display area for the advertising creative based upon a visual context of the first application;
i) displaying, by the first application executing on the computing device in the foreground process, the advertising creative previously downloaded to the computing device within the determined display area of the first application;
j) detecting, by the first application executing on the computing device in the foreground process, a user interaction with the displayed advertising creative;
k) installing, by the computing device, the second application using the downloaded one or more application installation files upon detecting the user interaction with the advertising creative and upon determining that the second application is not installed on the computing device;
l) determining, by the computing device, whether the second application is installed successfully on the computing device when the installation process ends; and
m) displaying, by the computing device, a website from which the second application can be installed when the second application is not installed successfully on the computing device.

12. The method of claim 11, further comprising, after installation of the second application, registering, by the computing device, an installation status of the second application.

13. The method of claim 11, wherein the computing device is a mobile computing device.

14. The method of claim 11, wherein the user interaction with the advertising creative comprises a click on the advertising creative.

15. The method of claim 11, further comprising executing, by the computing device, the second application upon detecting the user interaction with the advertising creative and upon determining that the second application is installed successfully.

16. The method of claim 11, wherein the advertising creative contains a deeplink associated with the second application, the method further comprising executing, by the computing device, the second application based on the deeplink.

17. The method of claim 11, further comprising configuring, by the computing device, the second application based on the advertising creative.

18. The method of claim 11, further comprising writing, by the computing device, application data to a memory space associated with the second application.

19. The method of claim 11, wherein the one or more application installation files comprise one or more Android Application Package files.

20. The method of claim 10, wherein initiating the installation process for the second application using the downloaded one or more application installation files comprises launching an Android Intent that triggers installation of the downloaded application installation files.

21. The method of claim 19, wherein initiating the installation process for the second application using the downloaded one or more application installation files comprises launching an Android Intent that triggers installation of the downloaded application installation files.

22. The method of claim 1, wherein the first application comprises a video game and the display area comprises a billboard within the video game.

23. The method of claim 11, wherein the first application comprises a video game and the display area comprises a billboard within the video game.

* * * * *